United States Patent [19]

Schulz et al.

[11] 4,223,730

[45] Sep. 23, 1980

[54] METHOD FOR THE TERTIARY RECOVERY OF PETROLEUM BY FLOODING WITH HOT WATER AND AN AQUEOUS ALKALINE SOLUTION

[75] Inventors: Walther Schulz, Vechta; Wilhelm Gebetsberger, Barnstorf, both of Fed. Rep. of Germany

[73] Assignee: Wintershall Aktiengesellschaft, Kassel, Fed. Rep. of Germany

[21] Appl. No.: 918,555

[22] Filed: Jun. 23, 1978

Related U.S. Application Data

[63] Continuation-in-part of Ser. No. 760,433, Jan. 18, 1977, abandoned.

[30] Foreign Application Priority Data

Jan. 23, 1976 [DE] Fed. Rep. of Germany ....... 2602450

[51] Int. Cl.$^3$ .................... E21B 43/22; E21B 43/24
[52] U.S. Cl. .................................. 166/272; 166/252; 166/273; 166/274

[58] Field of Search ............... 166/272, 273, 274, 303, 166/252

[56] References Cited

U.S. PATENT DOCUMENTS

| | | | |
|---|---|---|---|
| 3,279,538 | 10/1966 | Doscher | 166/272 X |
| 3,637,018 | 1/1972 | Kelly et al. | 166/272 |
| 3,731,741 | 5/1973 | Palmer et al. | 166/272 |
| 3,802,508 | 4/1974 | Kelly et al. | 166/272 |
| 3,847,219 | 11/1974 | Wang et al. | 166/272 X |
| 3,854,531 | 12/1974 | Carlin | 166/273 X |
| 3,880,237 | 4/1975 | Snavely, Jr. | 166/272 X |
| 3,913,671 | 10/1975 | Redford et al. | 166/272 X |

FOREIGN PATENT DOCUMENTS

| | | | |
|---|---|---|---|
| 639050 | 3/1962 | Canada | 166/272 |
| 2409080 | 9/1974 | Fed. Rep. of Germany . | |

*Primary Examiner*—Stephen J. Novosad
*Attorney, Agent, or Firm*—Haseltine, Lake & Waters

[57] ABSTRACT

A method for the recovery of crude petroleum from mineral oil deposits, utilizing hot water flooding or alkali containing hot water flooding is described.

9 Claims, No Drawings

METHOD FOR THE TERTIARY RECOVERY OF PETROLEUM BY FLOODING WITH HOT WATER AND AN AQUEOUS ALKALINE SOLUTION

This is a continuation-in-part of U.S. Pat. Application No. 760,433, filed Jan. 18, 1977, now abandoned.

It is known that the recovery of mineral oil deposits, and more particularly of highly viscous petroleum may be improved by flooding with hot water. The hot water heats up the deposits, whereby the viscosity of the oil is reduced and the flowability of the oil is increased. Alkaline solutions, by changing the pH in the alkaline range, effect a reduction of the interfacial oil/water tension, whereby the petroleum is detached from the surfaces of the pores of the rock and an oil-water emulsion is formed which enhances the effect of displacement and thus increases the degree to which the oil is removed.

A method of recovering hydrocarbons from an underground formation containing hydrocarbon by means of steam flooding is known from German laid-open Pat. No. 2,323,261, which method comprises admitting into the warm formation a mixture of steam and a small quantity of an agent which obviously is to serve the purpose of reducing the interfacial tension between condensed steam and said immiscible hydrocarbons. Also a solution of NaOH with a concentration of about from 0.1 to 0.5% by weight combined with 0.1 to 0.5% quinoline is to be used for reducing the interfacial tension. This mode of carrying out the work has the drawback that for recovering the petroleum, steam is required which must be energy-enriched; furthermore, the addition of NaOH, for example, together with quinoline or other substances is needed to reduce the interfacial tension. This mode of operation poses the danger that the emulsion thus formed may become unstable, and the uniform distribution in the steam of those substances reducing the interfacial tension may be controlled with difficulty only.

It is the object of the present invention to utilize the heat stored in the carrier bed after the flooding with hot water for the flooding with alkaline, water-soluble materials, and to utilize it, in addition to effect emulsion formation, by reducing the oil viscosity due to the heating of the carrier bed, thus improving the removal of the oil while at the same time maintaining the stability of the emulsion in the carrier bed.

A prejudice exists in this technical field against the flooding with soda lye because if Ca— and Mg— ions are present in the water of the deposits, hydroxides will be precipitated which may clog the deposits, and because Ca— and Mg— ions will render those materials ineffective which act interfacially. Surprisingly, it was found that Ca— and Mg— ions present in the water of the deposit will not limit the performance of the present invention even if contained in said water in higher concentrations.

Now, a method for the tertiary recovery of petroleum by hot water flooding or by flooding with alkaline, water-soluble materials has been found which is characterized in that after the flooding with hot water, soda lye is admitted at ambient temperature as the flooding agent into the deposit which has been heated up by the hot water, and in that upper temperature limit is adjusted only to such a degree that the resulting emulsion formed from the petroleum together with the soda lye will practically remain stable.

It was found further that the temperature of the deposit, when it is above that temperature at which the emulsion is forming from the petroleum and the alkaline, water-soluble materials, may be reduced by interrupting the hot water flooding, or by admitting cold water, to such a temperature at which the forming emulsion will practically remain stable.

It was found further that the flooding with soda lye is carried out continuously preferably with a soda lye concentration within the range of 0.05 to 10% by weight per total weight of solution.

It was found further that the flooding with soda lye is preferably carried out discontinuously.

It was found further that after a cushion of alkaline solution, flooding is carried out with water as the flooding agent.

It was found further that the present method is applied also to deposits containing Ca— and Mg— ions in the water of the deposit.

The method of the present invention is explained further with the help of examples 1 and 2 without being limited to said examples.

The model deposits were natural sandstone granules obtained from a quarry. These granules were saturated with crude petroleum and a salt water conforming to the water of a deposit.

TABLE

|  | Example 1 | Example 2 |
|---|---|---|
| Rock Stratum | | |
| Length | 26.5 cm | 26.5 cm |
| Diameter | 5.17 cm | 5.17 cm |
| Pore Volume (PV) | 115.0 ml | 109.3 ml |
| Permeability for Salt Water | 2380 md | 2300 md |
| Porosity | 20.7% | 19.6% |
| Crude Oil | | |
| Density at 40° C. | 0.894 kg/l | 0.894 kg/l |
| Viscosity at 40° C. | 220 cP | 230 cP |
| Salt Water | | |
| Density at 40° C. | 1.089 kg/l | 1.089 kg/l |
| Viscosity at 40° C. | 0.92 cP | 0.92 cP |
| Concentrations: NaCl | 106 g/l | 106 g/l |
| $CaCl_2$ | 27 g/l | 27 g/l |
| $MgCl_2$ | 4 g/l | 4 g/l |
| Flooding | | |
| Step 1 | | |
| Salt Water | | |
| Temperature of the carrier bed | 40° C. | 40° C. |
| Quantity | 2,430 ml | 2,620 ml |
| Step 2 | | |
| Salt Water | | |
| Temperature of the carrier bed | 80° C. | 80° C. |
| Quantity | 1,150 ml | 1,480 ml |
| Step 3a | | |
| NaOH | | |
| Concentration | 4% by weight | 8% by weight |
| Temperature of the carrier bed | 80° C. | 80° C. |
| Quantity | 115 ml | 22 ml |
| Step 3b | | |
| Salt Water | | |
| Temperature of the carrier bed | 40° C. | 40° C. |
| Quantity | 700 ml | 1,250 ml |
| Remaining oil saturation in % of pore volume | | |
| Step 1 | 47.2% | 48.5% |
| Step 2 | 45.8% | 46.8% |
| Step 3 | 21.2% | 25.4% |

These examples show how according to the method of the present invention, the remaining oil saturation is reduced after the hot water flooding from 45.8 and 46.8% to 21.2 and 25.4%, respectively.

A comparative test carried out under conditions comparable to those of example 2 and comprising the use of NaOH with a concentration of 8% by weight and no heating of the carrier bed to 80° C. showed a remaining oil saturation of 41.7%.

We claim:

1. A method for the tertiary recovery of petroleum by hot water flooding or flooding with alkaline, water-soluble materials in the deposits, which, after the hot water flooding into the deposit heated by hot water, is comprised by admitting an aqueous soda lye solution at ambient temperature as the flooding agent into the deposit heated by the hot water, and adjusting the upper temperature limit of said deposit to such a degree that the resulting emulsion formed from the petroleum with the soda lye remains practically stable.

2. A method according to claim 1, which is comprised in that the temperature of the deposit, when exceeding the temperature at which the emulsion forms from the petroleum with said alkaline, water-soluble materials, is reduced by interruption of the hot water flooding to such a temperature at which the emulsion formed is substantially stable.

3. A method according to claim 2, wherein the flooding with soda lye is carried out continuously.

4. A method according to claim 2, wherein the lye concentration is from 0.05 to 10% by weight per total weight of solution the flooding with soda lye is carried out discontinuously.

5. A method according to claim 2, wherein the temperature of the deposit, when exceeding that at which the emulsion forms from the petroleum with the alkaline, water-soluble materials, is reduced by admitting cold water into said deposit to such a temperature at which the emulsion formed is substantially stable.

6. A method according to claim 5, wherein the flooding with soda lye is carried out continuously.

7. A method according to claim 6, wherein the lye concentration is from 0.05 to 10% by weight the flooding with soda lye is carried out discontinuously.

8. A method according to claim 1, wherein after a cushion of alkaline solution, flooding is carried out with water as the evacuant.

9. A method according to claim 1, wherein said method is additionally employed for deposits containing Ca— and Mg— ions in the water of the deposit.

* * * * *